May 23, 1944.  W. R. KLECKNER  2,349,556
METHOD OF TREATING MAGNESIUM MINERALS
Filed Dec. 9, 1941
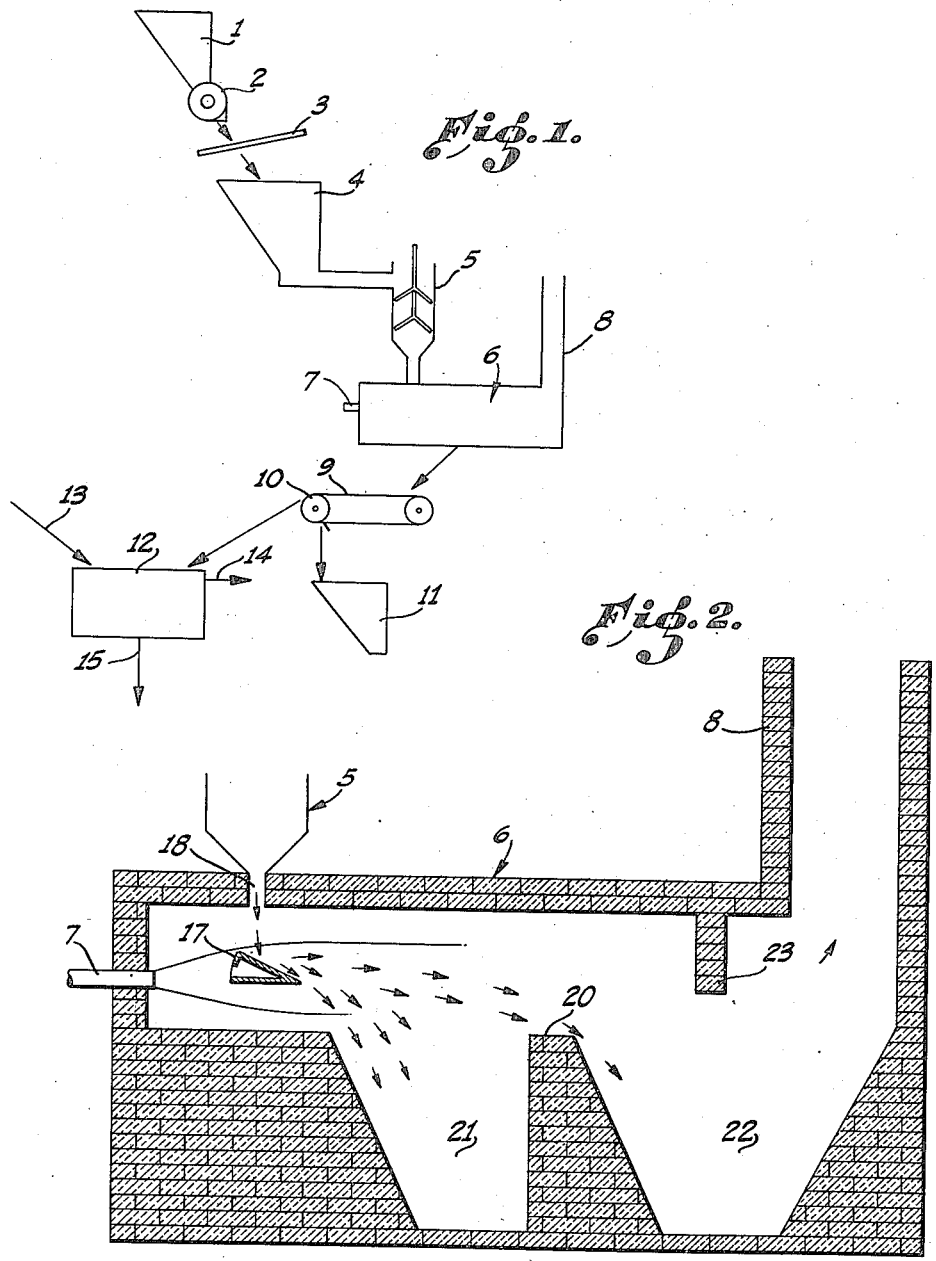
WILLIAM R. KLECKNER,
INVENTOR.
BY
ATTORNEY.

Patented May 23, 1944

2,349,556

UNITED STATES PATENT OFFICE 2,349,556

METHOD OF TREATING MAGNESIUM MINERALS

William R. Kleckner, Oakland, Calif., assignor to J. A. McCarthy, San Francisco, Calif.

Application December 9, 1941, Serial No. 422,259

4 Claims. (Cl. 23—91)

This invention pertains to methods and means whereby valuable products may be derived from certain minerals heretofore deemed unsuitable for other than rare and specialized uses. More specifically, the present invention is directed to a method of recovering iron and magnesian compounds from a family of magnesium minerals containing appreciable quantities of iron and is based upon the discovery that calcination of such iron-containing magnesium silicates disrupts the existing lattices, imparts to the iron magnetic properties and renders the magnesia content soluble in acid solutions and at the same time inhibits or materially reduces the solubility of the magnetite in the acid solutions.

The recovery of magnesium (either as a metal or in the form of soluble salts) from magnesia-containing minerals has been attempted repeatedly in the past but all of the previously known processes required that the raw or starting materials be relatively pure magnesium minerals of which brucite is an example, and moreover required numerous and relatively complicated procedures. It has been deemed impractical to employ as starting materials magnesian minerals containing appreciable quantities of iron. The present invention renders available for economic commercial manipulation an extensive supply of minerals containing magnesium, iron and silica, the process being notable for its simplicity, ease of control and economy.

Generally stated, the present invention is directed to a process in which any one or more of the many magnesian minerals containing iron may be used for the production of commercially utilizable magnesium compounds by subjecting such minerals to the following steps: crushing or grinding to a suitable state of division; rapid calcination of the finely divided material under reducing conditions and in the presence of moisture initially contained by the material, at temperatures above about 1100° C., whereby the iron content of the starting material is converted into magnetite, the process being characterized by the fact that the magnetite appears to be enveloped in a thin film resistant to the action of acid solutions.

Other changes described in detail hereinafter occur during calcination. The calcined product may then be leached for the recovery of soluble magnesium compounds and the magnetite content of the calcined material may be separately recovered.

It is an object of the present invention, therefore, to disclose and provide a method of treating iron-containing magnesian minerals for the recovery of iron therefrom.

A further object of the present invention is to disclose and provide a method of recovering appreciable proportions of magnesium, originally contained in minerals contaminated with iron, in virtually pure form.

A still further object of the invention is to disclose and provide means, materials and conditions of operation whereby many heretofore discarded magnesian minerals may be utilized as sources of iron and magnesium.

These and other objects, advantages, adaptations and uses of the present invention will become apparent to those skilled in the art from the following description of certain exemplary forms and procedures embraced by the present invention. In order to facilitate understanding, reference will be had to the appended drawing, in which:

Fig. 1 is a flow diagram illustrating one adaptation of the process of this invention.

Fig. 2 is a vertical longitudinal section through one form of calcining furnace which must be employed in carrying out the process.

As stated hereinbefore, the starting materials comprise magnesian minerals containing an appreciable amount of iron. Various pyroxenes such as bronzite ($MgFeSiO_3$), hypersthene ($FeSiO_3$), fayalite ($Fe_2SiO_4$), and olivine (($MgFe)_2SiO_4$), also known as chrysolite, as well as bastite, grunerite and cummingtonite, are exemplary of the minerals deemed desirable for use in this process. It is to be understood, however, that these minerals are not obtained in their pure form in nature in appreciable quantities and are generally associated with other magnesian silicates such as, for example, enstatite ($MgSiO_3$), forsterite ($Mg_2SiO_4$), serpentine, talc, sepiolite, saponite, etc. In order to attain greatest economy and ease of operation, the minerals employed should be relatively free from calcium, aluminum, chromium, nickel, manganese, and the alkalies.

By referring to Fig. 1, one form of the process may be readily understood. As there shown, the starting magnesian mineral may be fed from a bin 1 through suitable grinding or disintegrating machinery such as the mill 2, and after passing over screens 3 the finely divided material may be collected in storage bins 4. The fineness of subdivision of the starting material may vary with the size and type of furnace employed but it has been found desirable to reduce the starting material to such size that substantially all thereof passes a 20 mesh screen. From the storage bin 4 the finely divided material may be fed in any suitable manner into a feeding device 5, such as for example, a double bell type of feeder adapted to discharge the finely divided material in a substantially continuous manner and without access of extraneous air into a calcining furnace 6, burners being indicated at 7 and a stack at 8. In this furnace (shown in greater detail in Fig. 2) the finely divided material is calcined under reducing conditions. The calcined material may then be discharged from the furnace and if desired passed over suitable magnetic separators such as, for example, the conveyor 9 provided with magnetic pulleys 10 and scraping devices which permit the magnetite to be separated from the calcined material and made available for separate use. In the diagram, the magnetite is shown conveyed to storage bins 11. The calcined material, substantially free from magnetite, may then be conveyed to suitable leaching tanks 12 supplied with an aqueous acid solution as, for example, a dilute hydrochloric acid solution, by the line 13. It is to be understood that the construction, size and shape of the leaching tanks is influenced by commercial considerations, capacity of the plant and the purpose or uses to which the material is to be put. Similarly, the type of acid employed, its concentration and the like, may be varied. Dilute hydrochloric acid is to be employed in the event magnesium chloride is desired as an end product.

A series of tanks may be employed, flow of fresh acid being so arranged as to be substantially countercurrent to the calcined mineral fed to the series of tanks. At all events, the resulting solution may be discharged as indicated at 14 and will contain magnesium chloride in solution. Such magnesium chloride solutions may be employed in any suitable manner and may be concentrated or evaporated. The residual leached material may be continuously or periodically discharged as indicated by line 15 and will consist essentially of free silica and some magnesium silicate. By reason of the physical changes which take place during calcination and the state of division of the residual material and its chemical analysis, the residual material has a wide variety of possible uses such as, for example, as an ingredient in magnesite refractories, as a neutralizing and percolating agent for use in oil refining, as a clarifying and decolorizing agent, filler in paints and other compositions, etc.

A form of furnace found satisfactory for use in the process of this invention is illustrated in Fig. 2. As there shown, the furnace includes an impingement plate 17 positioned immediately beneath the inlet 18 connecting with the feeding device 5 and through which the finely divided starting mineral is introduced. The impingement plate 17 is inclined away from the burner 7, which is preferably of the blast type, it being desirable to maintain reducing conditions within the furnace at all times. A portion of the combustion flame and gases should extend beneath the impingement plate 17, the impingement plate being preferably so located with respect to the burner 7 as to be heated to a temperature preferably in excess of 1100° C. In the event the impingement plate is made of steel, the temperature should be just below the melting point of the steel. The calcining temperature should not be sufficient to actually fuse the magnesium silicate although it may be sufficiently high to raise the material to almost a state of incipient fusion.

The furnace is preferably provided with a transverse barrier 20 separating two settlement pits 21 and 22. The top of the barrier 20 is sufficiently below the impact plate 17 and the roof of the furnace 6 so as not to impede the flow of gases toward the stack. Above the pit or settlement basin 22 a downwardly extending baffle 23 may be provided for the purpose of directing the gases downwardly into the pit 22, thereby imparting a downward velocity to whatever small particles of calcined mineral may have been carried by the gases over the top of the barrier 20 and thereby facilitating the deposition of such small particles in the enlarged pit 22.

The roof of the furnace 6 may be either flat or arched and it is to be understood that either one or a plurality of burners as well as one or more of the inlet openings 18 may be provided, depending upon the size of the furnace. Moreover, additional compartments, pits or settlement basins may be provided.

In actual operation, after the furnace and impact plate 17 have been preheated, the finely divided magnesium mineral may be continually fed to the furnace. It is to be understood that the mineral so fed generally has an ignition loss which may range from about 8% or 9% to as high as 20% by weight, such ignition loss including naturally occurring moisture and water of crystallization. It is further to be noted that the preferred minerals for use in the process of this invention contain but very small quantities of lime as impurity and are preferably low in alkali content. No fluxes need be added to the material prior to its introduction into the furnace. As the particles of magnesium mineral hit the impact plate 17 (which is inclined toward the stack and intervening settlement pits) they pass through the high temperature combustion gases of the burner 7 and are rapidly calcined. The loss of moisture and water of combination is substantially instantaneous, causing a disruption of the particles. After impact the particles move downwardly and toward the stack of the furnace, the heavier particles passing directly through the flames of the burner extending beneath the impact plate and then into the collection pit 21. These particles are thoroughly calcined by contact with the stream of blast burner gases. The smaller and lighter particles are carried by the gases over the top of the transverse bridge or partition 20 and are then downwardly deflected by the baffle 23. These finer particles are deposited in the collection pit 22 whereas the gases rise upwardly through the stack 8. As previously stated, additional baffles and pits may be provided in order to inhibit material losses of calcined mineral by the stack. In actual practice, stack losses have been found to be relatively small even though only two collection pits were employed.

Although in the exemplary furnace described herein reference is made to the use of a steel impingement plate 17, it is to be understood that other materials may be employed instead. Moreover, the invention is not limited to the use of the particular furnace described since the calcination may be carried out in furnaces of other design provided the calcination is rapidly conducted under reducing conditions while the material is in a state of fine division, in the presence of its inherent water of combination and in the absence of added fluxes and at temperatures of above about 1100°–1200° C. whereby the desirable results herein referred to may also be obtained.

The furnace is preferably provided with means for discharging the calcined and collected particles from the collection pits 21 and 22 through which means the material may be removed either periodically or continuously. The introduction of air into the furnace through such exit means should be held at a minimum. As previously stated, the calcined materials may then be sent through suitable magnetic separators for the removal of magnetite or when desired, the calcined material may be sent directly to the leaching tank 12.

It is to be understood that the iron content of the minerals subjected to treatment in the process herein described is in substantially all cases non-magnetic prior to calcination. During calcination at the temperatures indicated, namely, above about 1100° C., and preferably from about 1200° C. to say 1500° C., under the reducing conditions disclosed the iron is converted into magnetite. Moreover, although the original magnesia content of the minerals is ordinarily not in readily soluble form, it is rendered available and readily soluble by the treatment herein disclosed. It has also been discovered that although magnetite is generally considered to be soluble in hydrochloric acid, the calcination described herein appears to result in the formation of an envelope film or enclosing skin which is resistant to the action of hydrochloric acid and thereby permits acid leaching of the calcined product without solution of the iron in the liquor during the extraction of the magnesium salts.

The calcined product, moreover, shows the effects of the rapid calcination in that it has been disrupted into irregular fragments and exhibits some evidence of intumescence and exfoliation. This may be due, in part at least, to the fact that substantially all of the minerals adapted for treatment in the process of this invention are minutely stratified or laminated and the disruption of the lattice forms by such rapid calcination results in cleavage and exfoliation. Changes in chemical composition and mineralogical structure take place. For example, when an iron-containing magnesian mineral of the general serpentine class (also containing enstatite, bronzite, forsterite and hypersthene) was calcined in accordance with this invention it was found that the resulting product contained olivene crystals and that substantially all of the originally contained iron had been converted into magnetite, this being easily observable under the microscope at a magnification of only 200 diameters. The analyses before and after calcination were as follows:

|  | Starting material | Calcined material |
|---|---|---|
|  | Per cent | Per cent |
| $SiO_2$ | 38.22 | 44.15 |
| $Fe_2O_3$ | 5.99 | 9.20 |
| MgO | 38.66 | 46.50 |
| CaO | 0.05 | 0.05 |
| $Al_2O_3$ |  |  |
| Ignition loss | 17.46 |  |

By subjecting the calcined material above identified to magnetic separation, it was found that 8.78% of the total could be so separated.

The calcined material above identified, while still containing the magnetic components, was subjected to leaching in 1:1 hydrochloric acid solution for a period of one hour. The temperature of the leaching bath increased slightly during the extraction and after filtration or decantation it was found that the acid solution was substantially saturated with magnesium chloride and upon evaporation produced a product consisting of 99.6% magnesium chloride $$(MgCl_2.6H_2O).$$

This product contained only 0.26% $Fe_2O_3$ and only 0.10% $SiO_2$.

It is to be understood, however, that the leaching operations may be carried out with acid solutions of different concentrations, the acid content being preferably sufficient to completely combine with the magnesium so as to result in a substantially neutral saturated solution. Leaching operations conducted for the production of magnesium chloride are preferably carried out at temperatures below about 95° C. since at higher temperatures there is greater possibility of increasing the iron content of the solution. If, however, the calcined product is magnetically separated before leaching so that the iron content is reduced to a minimum, the leaching operations may then be carried out at any temperature or concentration.

Although specific reference has been made herein to the use of hydrochloric acid solutions during leaching, it is to be understood that sulfuric, nitric or other acids may also be employed.

I claim:

1. A method of recovering values from silicate minerals composed essentially of silica, magnesium and iron and containing but small amounts of alkalies, calcium and alumina, which comprises: crushing such minerals to a state of fine division; calcining the crushed minerals under reducing conditions to a temperature of between about 1100° C. and a higher temperature not materially in excess of the temperature of incipient fusion of the crushed material, for a time sufficient to disrupt the crystal lattice structure of the minerals, in part at least; subjecting the calcined material to magnetic separation to remove a major proportion of the iron content thereof; and subjecting the calcined material from which the magnetically separable fraction had been removed, to leaching with an acidulated aqueous medium at a temperature below about 95° C. to extract magnesium therefrom.

2. A method of recovering values from silicate minerals composed essentially of silica, magnesium and iron and containing but small amounts of alkalies, calcium and alumina, which comprises: crushing such minerals to a state of fine division; calcining the crushed minerals under reducing conditions to a temperature of between about 1100° C. and a higher temperature not materially in excess of the temperature of incipient fusion of the crushed material, for a time sufficient to disrupt the crystal lattice structure of the minerals, in part at least; subjecting the calcined material to magnetic separation to remove a major proportion of the iron content therefrom; and subjecting the calcined material from which the magnetically separable fraction had been removed to leaching with an acidulated aqueous medium to extract magnesium therefrom, the acid content of said acidulated medium being sufficient to form a saturated solution of the acid salt of magnesium extracted from the calcined material.

3. A method of recovering values from silicate minerals composed essentially of silica, magnesium and iron and containing but small amounts of alkalies, calcium and alumina, which comprises: crushing such minerals to a state of fine division; calcining the crushed minerals under reducing conditions to a temperature of between about 1100° C. and a higher temperature not materially in excess of the temperature of incipient fusion of the crushed material, for a time sufficient to disrupt the crystal lattice structure of the minerals, in part at least; subjecting the calcined material to magnetic separation to remove a major proportion of the iron content therefrom; subjecting the calcined material from which the magnetically separable fraction had been removed to the action of a dilute hydrochloric acid solution to form a magnesium chloride solution, and separating such solution from the residual solids.

4. A method of recovering values from magnesian ores containing appreciable amounts of minerals from the group consisting of bronzite, hypersthene, bastite, grunerite, cummingtonite, olivene, serpentine, meerschaum, steatite, enstatite and forsterite, which comprises: subjecting the magnesian ore, while in a state of fine division and in motion, to the action of a reducing burner blast to calcine the ore to a temperature of between about 1200° C. and 1500° C.; subjecting the calcined ore to magnetic separation to remove a major proportion of the iron content therefrom, and then subjecting the calcined ore from which the magnetically separable fraction had been removed, to leaching with an acidulated aqueous medium to extract magnesium therefrom.

WILLIAM R. KLECKNER.